United States Patent
Graham et al.

(10) Patent No.: US 7,720,957 B2
(45) Date of Patent: *May 18, 2010

(54) AUTO-CONFIGURATION OF AN INTERNAL VLAN NETWORK INTERFACE

(75) Inventors: Charles S. Graham, Rochester, MN (US); Harvey G. Kiel, Rochester, MN (US); Chetan Mehta, Austin, TX (US); Lee A. Sendelbach, Rochester, MN (US); Jaya Srikrishnan, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/369,700

(22) Filed: Feb. 11, 2009

(65) Prior Publication Data

US 2009/0150504 A1     Jun. 11, 2009

Related U.S. Application Data

(63) Continuation of application No. 10/670,709, filed on Sep. 25, 2003, now Pat. No. 7,502,842.

(51) Int. Cl.
G06F 15/177 (2006.01)
G06F 15/16 (2006.01)

(52) U.S. Cl. .................. 709/223; 709/206; 709/225; 709/245; 709/227; 709/250; 709/229; 709/217; 709/238; 711/129; 711/113; 711/153; 711/173; 711/114; 713/170; 713/153; 713/158; 710/1; 710/34; 710/52; 710/56

(58) Field of Classification Search .......... 709/223–229, 709/206, 217, 245, 250, 238; 713/200, 153, 713/158
See application file for complete search history.

(56) References Cited

U.S. PATENT DOCUMENTS

| 7,502,842 B2 * | 3/2009 | Graham et al. ............... 709/223 |
| 2004/0215781 A1 * | 10/2004 | Pulsipher et al. ............ 709/227 |
| 2005/0071446 A1 | 3/2005 | Graham et al. |
| 2006/0106585 A1 * | 5/2006 | Brown et al. ................... 703/1 |

* cited by examiner

*Primary Examiner*—Jude J Jean Gilles
(74) *Attorney, Agent, or Firm*—Patterson & Sheridan, LLP (57) ABSTRACT

Apparatus and storage media for auto-configuration of an internal network interface are disclosed. Embodiments may install an internal VLAN manager in a logically partitioned computer system along with network agents in each of the partitions in the logically partitioned system to facilitate configuring an internal communications network and the corresponding internal network interfaces in each participating partition. In particular, an administrator accesses internal VLAN manager, selects an internal VLAN ID, selects each of the participating partitions, and configures the communications network with global parameters and ranges. The internal VLAN manager then generates partition parameters and incorporates them into messages for each of the partitions selected to participate in the internal network. Each of the participating partitions receives one of the messages and, in response, invokes the corresponding network agent that extracts partition parameters from the message and creates or re-configures an internal network interface based upon the parameters.

23 Claims, 5 Drawing Sheets

AUTO-CONFIGURATION OF AN INTERNAL VLAN NETWORK INTERFACE

CROSS-REFERENCE TO RELATED APPLICATIONS

This application is a continuation of co-pending U.S. patent application Ser. No. 10/670,709, filed Sep. 25, 2003, which is herein incorporated by reference in its entirety.

BACKGROUND OF THE INVENTION

1. Field of the Invention

The present invention generally relates to the field of logically partitioned computer systems. More particularly, the present invention relates to methods, systems, and media for auto-configuration of internal network interfaces for networks that facilitate communication between the partitions of logically partitioned computer systems.

2. Description of the Related Art

Parallel processing generally refers to performing multiple computing tasks in parallel. Traditionally, parallel processing required multiple computer systems with the resources of each computer system dedicated to a specific task or allocated to perform a portion of a common task. For instance, one computer system may be dedicated to sales systems, another to marketing systems, another to payroll systems, etc.

The computer systems typically communicate via local area networks (LANs) to gather data for each specific task and coordinate tasks between the multiple computer systems. Multiple LANs can be implemented to separate communications for purposes related to security and isolation of sensitive tasks and data. Specifically, each computer system is connected to a network switch for a LAN to transmit transactions to other computer systems and each operating system running on the multiple computer systems has its own Transmission Control Protocol/Internet Protocol (TCP/IP) stack to coordinate transmission and receipt of the transactions. For instance, when data is being transmitted out of a computer system, the data is first forwarded to the TCP/IP stack. The TCP/IP stack adds a TCP header to the data to identify the application programs running on the source and the destination computer systems that are involved in the transaction and an IP header to the data to identify the IP addresses of the source and destination computer systems.

However, recent advances in computer hardware and software technologies have resulted in single computer systems capable of performing highly complex parallel processing by logically partitioning the system resources to different tasks running in multiple operating system instances. In a logically partitioned (LPAR) computer system, available system resources are allocated among multiple sets of resources so that each set of resources can be operated independently of the other. The task of splitting these resources among logical partitions is typically accomplished via a layer of firmware components that can be referred to as a partition manager. The partition manager firmware is a layer of software between operating system software and the hardware (for example, processors and memory).

One objective of a partition manager is to allow each logical partition to run software, such as operating systems and operating system specific applications that are typically developed to run on a dedicated computer system with little or no modification. For example, a system administrator may want one logical partition to run IBM's OS/400 operating system, a second logical partition to run IBM's AIX operating system, and a third logical partition to run the LINUX™ operating system. By providing the ability to run multiple operating systems on the same computer system, a LPAR computer system may provide a user with a great deal of freedom to choose the application software best suited to the users' need and with little or no regard to the operating system for which the application program was written. Running multiple logical partitions on a single system can better utilize system resources; for example, the utilization of processors and memory on a logical partitioned system is typically higher than separate systems. System resources can also be moved from one logical partition to another as required.

The partition manager starts and controls logical partitions. In particular, the partition manager controls which operating system runs in which logical partitions and which processing resources and memory resources are available to each partition. The partition manager also isolates partition memory from other partitions and controls which partition owns which I/O adapters.

Some type of systems management function typically controls the partition manager. The system management function will typically run on an external PC or a rack mounted PC. The system administrator uses this system management function to specify the number of partitions, the operating system to use in each partition, processors and memory available to the partition, and I/O adapters assigned to the partition. The system management function can communicate with the partition manager in various methods, for example, a command/response communications interface or via configuration files.

In an effort to facilitate the transition between the multiple computer systems and an LPAR computer system, LPAR computer systems are typically designed to implement internal virtual LANs (internal VLANs) to simulate communication between partitions as if they were conducted through actual LANs of multiple computer systems. Operating systems designed to operate on multiple computer systems implement TCP/IP stacks to facilitate transmission of transactions between computer systems and internal VLANs take advantage of the TCP/IP stacks by maintaining one or more virtual network switches in the partition manager to transmit transactions between partitions. The virtual network switches are governed by rules similar to those of real or physical switches to accommodate transactions based upon limitations associated with the operating systems, although virtual network switches are more flexible with regard to parameters that are related to physical limitations of LANs between multiple computer systems. For instance, buffer sizes within physical network switches of LANs typically restrict frame sizes of associated messages transmitted between computer systems, whereas the buffer sizes allocated for virtual network switches can be selected for optimal communications between partitions.

Advantages related to the reduced physical limitations for internal VLANs have led to increased complexities in configuring internal VLANs. In particular, customers have found that the benefits of isolating internal VLANs outweighs the costs associated with external LANs in more situations since implementing an internal VLAN no longer includes costs related to purchasing, installing, and maintaining network switches, Ethernet cards, cables, and the like. Thus, hundreds to thousands of internal VLANs may potentially be configured for each LPAR computer system.

Manually configuring internal VLANs is time consuming, error prone, and complex. Configuring an internal VLAN involves identifying each virtual network switch with an internal VLAN identification (ID) and, within each of the potentially hundreds to thousands of partitions, manually setting up an internal network interface for each VLAN ID that can be used by the partition. In addition, the internal network interfaces must be adapted for each of the corresponding operating systems to allow each operating system to communicate with other partitions via one or more of the virtual network switches. This is particularly complex since each partition may include different operating systems and the parameters are typically sequences of numbers that are not human-intuitive. A configuration error such as a bad VLAN ID, bad port number, or bad Internet protocol (IP) address, can cause a communication failure between the operating system and the internal network switch. Determining the cause of that communication failure would be time-consuming. Further, configuring internal network interfaces on different operating systems can involve sequences of instructions that are unique to each operating system.

Therefore, there is a need for methods, systems, and media for simplifying the configuration of device interfaces for internal networks such as VLANs, preferably allowing for the automatic configuration of internal network interfaces with little or no user intervention.

SUMMARY OF THE INVENTION

Embodiments of the invention generally provide apparatus, systems, and media to auto-configure network interfaces.

One embodiment provides an apparatus for auto-creation of internal network interfaces for participating partitions. The apparatus generally includes a partition having a network agent to be invoked upon receipt of a message, the partition being one of the participating partitions associated with an internal network, wherein the network agent is adapted to configure an internal network interface of the internal network interfaces in response to the message; an internal VLAN manager to generate the message based upon global parameters and ranges associated with the internal network, the message to comprise partition parameters for the internal network interface; and a message transmitter to transmit the message from the internal VLAN manager to the partition based upon a list of participating partitions associated with the internal network.

Another embodiment provides a system for auto-creation of internal network interfaces. The system includes partitions, each partition having a network agent to be invoked upon receipt of a message, wherein the network agent is adapted to configure an internal network interface of the internal network interfaces in response to the message; an internal VLAN manager to configure an internal network to facilitate communication between at least two of the partitions, the internal VLAN manager to generate distinct messages based upon global parameters and ranges associated with the internal network, each distinct message to comprise distinct partition parameters to configure the internal network interfaces; and a partition manager to transmit the messages from the internal VLAN manager to the at least two partitions, each distinct message being transmitted to a different partition of at least two partitions based upon a list of the at least two of the partitions indicating an association with the internal network.

Yet another embodiment provides a computer readable medium containing a program which, when executed, performs an operation, including obtaining global parameters and ranges associated with the internal network; determining a set of partition parameters for the partition based upon the global parameters and ranges; generating a message for the partition, wherein the message comprises the partition parameters; and invoking the network agent via transmission of the message, the network agent being responsive to the message to configure an internal network interface based upon the partition parameters.

One other embodiment provides a computer readable medium containing a program which, when executed, performs an operation, generally including receiving a message having partition parameters, from an internal VLAN manager, wherein the message is associated with a network agent; invoking the network agent in response to receiving the message; and configuring the internal network interface based upon partition parameters via the network agent.

A further embodiment provides a computer readable medium containing configuration information accessible by an internal virtual local area network (VLAN) manager to set up an internal VLAN. The configuration information generally comprises an internal VLAN identification to identify the internal VLAN; global parameters and ranges for configuring the internal VLAN switch for the internal VLAN; at least one partition associated with the internal VLAN; and partition parameters to configure an internal network interface associated with the at least one partition, the internal network interface to be adapted by an internal network agent based upon the partition parameters for communication via the internal VLAN switch.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The following is a detailed description of embodiments of the invention depicted in the accompanying drawings. The embodiments are examples and are in such detail as to clearly communicate the invention. However, the amount of detail offered is not intended to limit the anticipated variations of embodiments, but on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media for auto-configuring internal network interfaces are contemplated. Embodiments may install an internal VLAN manager in a logically partitioned (LPAR) computer system along with network agents in each of the partitions in the system to facilitate configuring an internal communications network such as an internal virtual local area network (VLAN) and the corresponding internal network interfaces, or drivers, in each participating partition via a console of the internal VLAN manager. In particular, an administrator may access the internal VLAN manager to set up the internal communications network, setting an internal VLAN ID for the internal network, configuring global parameters and ranges of potential partition parameters, and selecting each of the participating partitions. Once the administrator configures the network with global parameters and ranges, the internal VLAN manager generates partition parameters and incorporates them into messages for each of the partitions selected to participate in the internal communications network. The messages are typically generated in a standard format such that a network agent of any partition may interpret the contents of the messages to generate an internal network interface. The messages are then transmitted to the participating partitions via a basic communication interface, referred to as a message transmitter hereafter, such as through the partition manager and/or service processor of the LPAR computer system.

An operating system (OS) of each of the participating partitions receives one of the messages and, in response, invokes the corresponding network agents. The network agents extract partition parameters from the messages, validate the parameters for the corresponding OS, create or re-configure an internal network interface based upon the parameters, and send a reply back to the internal VLAN manager to indicate whether creation/re-configuration of the internal network interface was successful. In some embodiments, when a user such as an administrator is reconfiguring the internal network interface, the current partition parameters may be requested by the internal VLAN manager and received via a reply from the corresponding network agent(s) to facilitate re-configuration.

While specific embodiments will be described below with reference to a VLAN utilizing TCP/IP stacks, those of skill in the art will realize that embodiments of the present invention may advantageously implement any other type of communication protocol such as protocols that may use a shared memory location or buffer rather than two TCP/IP stacks for a transaction across the internal network, advantageously reducing latency involved with transmission of transactions through two TCP/IP stacks. More generally, embodiments of the present invention are contemplated for use with blade servers, clusters, and other types of systems that include or can include at least a basic or primitive communication system for passing messages between computer systems, partitions, and/or the like.

One embodiment of the invention is implemented as a program product for use with a computer system such as, for example, the system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions, internal or external to the server. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Logically Partitioned System

Figure 1:
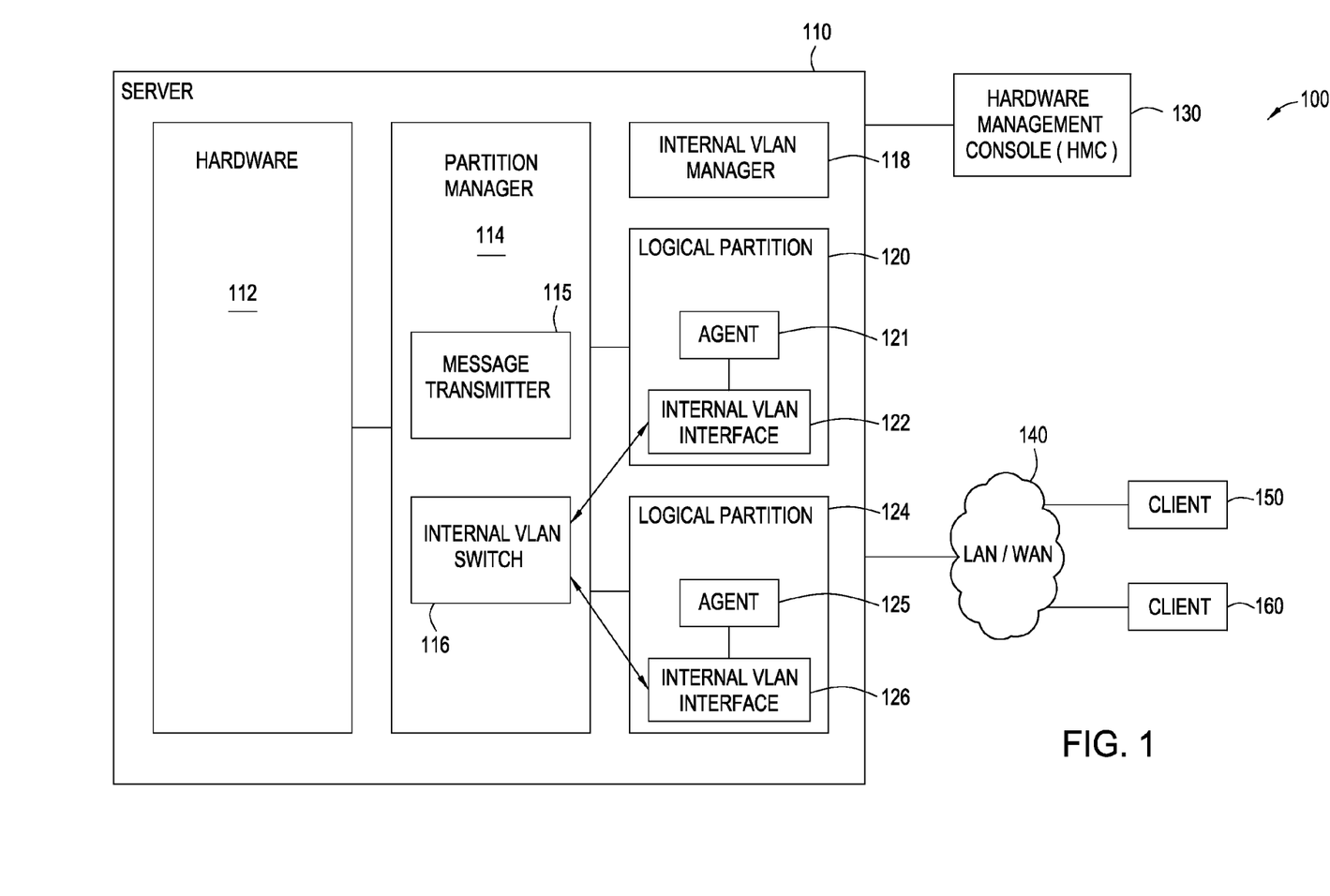
FIG. 1 is an embodiment of a system in accordance with embodiments of the present invention.

Turning now to the drawings, FIG. 1 depicts an embodiment of a system 100 for auto-configuration of internal VLAN interfaces 122 and 126. System 100 may include a server 110, a hardware management console (HMC) 130, a local area network/wide area network (LAN/WAN) 140, and clients 150 and 160. For example, server 110 may be logically partitioned to be perceived as two distinct computer systems that provide services to clients 150 and 160 and HMC 130 may provide an interface for an administrator to allow configuration of LPAR server 110.

Server 110 is a computer system providing processing and storage capacity to service clients 150 and 160. For example, server 110 may include server software for multiple departments of an organization like a database system, allowing members of each department to access the database software via logical partitions 120 and 124, while maintaining public and private databases for each department. Each department is assigned to a different logical partition and each logical partition is provided with processing capacity, memory, and data storage capacity to use the software on the server based upon demonstrated or known needs of the corresponding departments.

Server 110 includes hardware 112, a partition manager 114, an internal VLAN manager 118, and logical partitions 120 and 124. Hardware 112 represents the physical components of server 110 having one or more processors coupled with memory allocated between one or more logical partitions. For instance, server 110 may be a symmetric multiprocessor (SMP) system including a plurality of processors such as an IBM RS/6000 or a multi-platform operating environment such as an IBM eServer iSeries that supports software like OS/400, Linux™, AIX, and other e-business application environments on a single server for simplified management. Many such embodiments also support dynamic logical partitioning for allocation of resources and easy administration. In further embodiments, server 110 may include more than two logical partitions.

Logical partitions 120 and 124 represent logical divisions of resources available from server 110 via partition manager 114. The division allows the logical partitions to operate as independent logical systems, each having processing capacity, memory, storage capacity, and I/O devices. For instance, partition manager 114 may divide hardware 112 between the logical partitions 120 and 124 and have access to a specified range of physical memory addresses to manage the logical partitions. Logical partitions 120 and 124 may each have access to, e.g., 33% of the processing capacity of the remaining processors, memory and data storage capacity. In particular, partition manager 114 may enforce selections by the system administrator(s) who logically partitioned the system, restricting the access of logical partition 120 to one third of the processing capacity of one or more of the physical processors and a range of logical memory addresses, dynamically assigned to physical memory address via a look up table. Each logical partition may own its own I/O storage (hard disk).

Logical partitions 120 and 124 may include software to implement basic communications via message transmitter 115 to generate VLAN device interfaces 122 and 126, respectively. The VLAN device interfaces 122 and 126 may be generated via network agents 121 and 125, respectively, upon receipt of a message including partition parameters from internal VLAN manager 118.

HMC 130 is optional hardware (e.g., an external personal computer or a rack mounted personal computer) that may provide access for a system administrator for the server to create, manage, and remove logical partitions of server 110 such as logical partitions 120 and 124. In many of these embodiments, HMC 130 also provides access to server 110 to create and implement internal networks such as internal VLAN switch 116 and VLAN interfaces 122 and 126 for selected logical partitions. This partition manager system management function may also be done in a master partition, a service processor, or a blade.

In one embodiment, HMC 130 is coupled directly with server 110 via a dedicated Ethernet connection. In other embodiments, HMC 130 may couple with server 110 via a network like local area network/wide area network (LAN/WAN) 140.

LAN/WAN 140 is a network connection to couple server 110 with clients such as clients 150 and 160. In some embodiments, LAN/WAN 140 may include a network in an office coupled with a cable modem, a direct subscriber line (DSL), a T1 line, a T3 line, or the like. For example, server 110 operates as a web server allowing multiple businesses to connect to the web site independently via logical partitions for facilitating business-to-business (B2B) transactions. The client businesses can access their logical partition from anywhere in the world via the Internet to access software maintained in and services provided by logical partitions 120 and 124. In many embodiments, a master copy of partition parameters is maintained in the logical partitions.

Virtual Local Area Network (VLAN) Management

Partition manager 114 maintains logical partitions 120 and 124; provides a system administrator with the ability to create, manage, and remove logical partitions; provides a basic communications interface, message transmitter 115, between internal VLAN manager 118 and partitions 120 and 124; and facilitates implementation of one or more internal VLAN switches. In the present embodiment, partition manager 114 includes message transmitter 115 and internal VLAN switch 116. Message transmitter 115 may provide a communications queue linking internal VLAN manager 118 with logical partitions 120 and 124. For instance, internal VLAN manager 118 may generate a message to transmit to logical partition 120 and transmit the message to message transmitter 115. Message transmitter 115 may then forward the message to a memory location for logical partition 120 and transmit an interrupt to logical partition 120 to indicate receipt of the message. Further, logical partition 120 may generate a reply in response to the message and transmit the reply to message transmitter 115. Message transmitter 115 then forwards the reply to a memory location accessible by internal VLAN manager 118 and transmits an interrupt to indicate receipt of the reply.

Internal VLAN switch 116 may operate as a network switch and may be created in response to and in accordance with rules described by internal VLAN manager 118. For example, partition manager 114 may receive an instruction from internal VLAN manager 118 to create internal VLAN switch 116 to act as a switch for TCP/IP transactions between logical partitions included in a list of logical partitions. The list may be attached to the instruction and may include, for example, logical partitions 120 and 124. Internal VLAN switch 116 may then interact with VLAN device interfaces 122 and 126 of logical partitions 120 and 124 to transmit transactions between VLAN device interfaces 122 and 126. In further embodiments, additional internal VLAN switches may be implemented to set up multiple, isolated internal networks between different combinations of logical partitions as indicated by instructions received from internal VLAN manager 118.

Internal VLAN manager 118 may interact with an administrator to create one or more internal VLAN switches, each uniquely identified by internal VLAN identifications (IDs), and generate VLAN interfaces 122 and 126 to simulate distinct communication networks. More specifically, internal VLAN manager 118 may present one or more consoles to the administrator via HMC 130 to obtain global parameters and ranges for each internal VLAN switch, obtain lists of logical partitions to participate in the communication network implemented via each internal VLAN switch, and determine partition-specific parameters, hereinafter referred to as partition parameters, to configure internal network interfaces that allow each logical to participate in the communication networks. For example, internal VLAN manager 118 may present a console to the administrator to create internal VLAN switch 116 for TCP/IP based communications.

Figure 2:
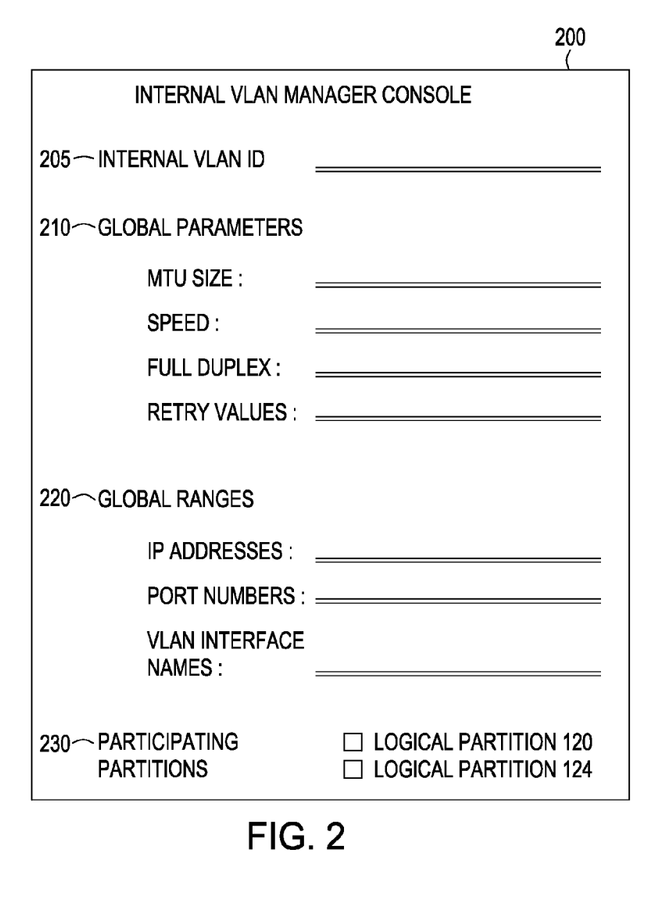
FIG. 2 depicts an example of a console for the system described in FIG. 1.

FIG. 2 presents an example of a console 200, e.g., a graphical user interface (GUI), presented to an administrator to obtain global parameters 210, global ranges 220, and participating partitions 230 to set up an internal VLAN switch and create or re-configure VLAN device interfaces. The console 200 may include a default range for internal VLAN IDs 205 and provide an editable default selection for the next available internal VLAN ID within the range. Global parameters 210 may include selectable and editable parameters such as a maximum transfer unit (MTU) size, a packet transmission speed, a full or half duplex setting, and a maximum number of retries for successful transmission of a transaction to another participating partition. Default parameter values will typically be provided. Global ranges 220 may include editable default ranges for participating partitions including Internet protocol (IP) addresses, port numbers, and VLAN interface names. In some of these embodiments, console 200 may also provide smart editing capabilities that anticipate portions of the ranges such as the first couple fields of IP addresses and VLAN interface names that include common prefixes plus variable suffixes. Further, console 200 may provide a list of available logical partitions from which that administrator may select participating partitions 230.

Referring again to FIG. 1, upon obtaining global parameters and ranges and the list of participating partitions for internal VLAN switch 116, internal VLAN manager 118 may generate an instruction to create internal VLAN switch 116.

Internal VLAN manager 118 may also generate partition parameters for configuring VLAN interfaces 122 and 126, and incorporate the partition parameters into messages for each of the participating partitions, such as logical partitions 120 and 124. In many embodiments, after the partition parameters are generated, the partition parameters are offered in editable form to the administrator for approval.

Figure 3:
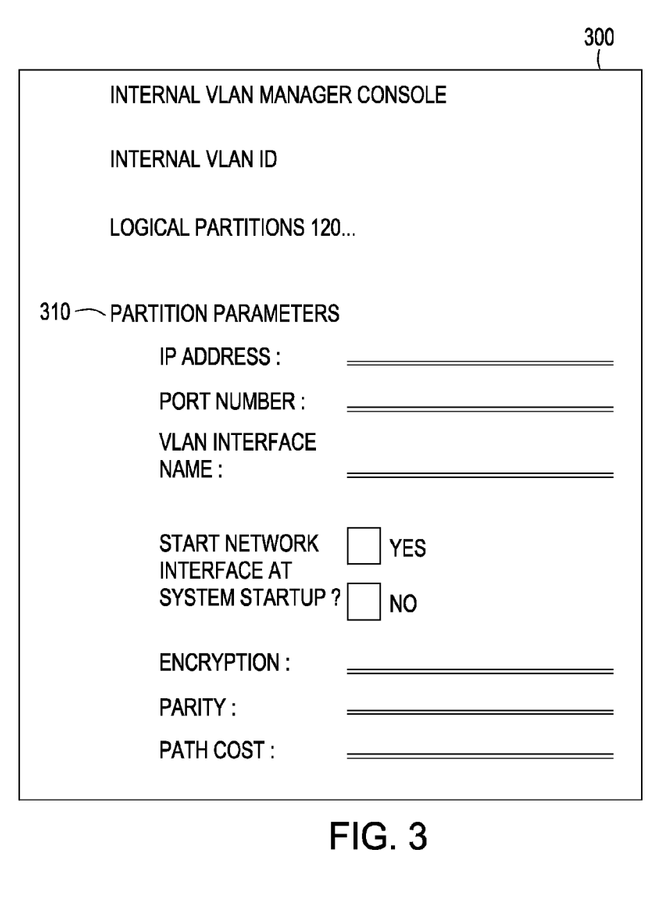
FIG. 3 depicts another example of a console for the system described in FIG. 1.

FIG. 3 presents an example of a console 300 presented to an administrator for approval of the partition parameters 310 for logical partition 120. For instance, internal VLAN manager 118 may generate IP addresses, port numbers, VLAN interface names, priorities, encryption, start network interface at server power up, and path cost based upon global parameters and ranges and default settings approved by the administrator. After the partition parameters 310 are approved by the administrator, and in some cases adjusted, the messages are transmitted to message transmitter 115 and forwarded to the participating logical partitions.

In several embodiments, the master copy of global parameters and ranges are maintained within internal VLAN manager 118 to facilitate re-configuration of the global parameters and ranges after the communications network is set up. For instance, the console 200 shown in FIG. 2 may be presented to the administrator to change the list of participating partitions 230. The administrator can add or delete partitions and internal VLAN manager 118 may generate the appropriate messages to remove or add, e.g., VLAN device interface 122 via agent 121.

Clients 150 and 160 include computer systems like personal computers, laptops, other servers, or the like, having hardware and software to communicate with server 110 via LAN/WAN 140.

Figure 4:
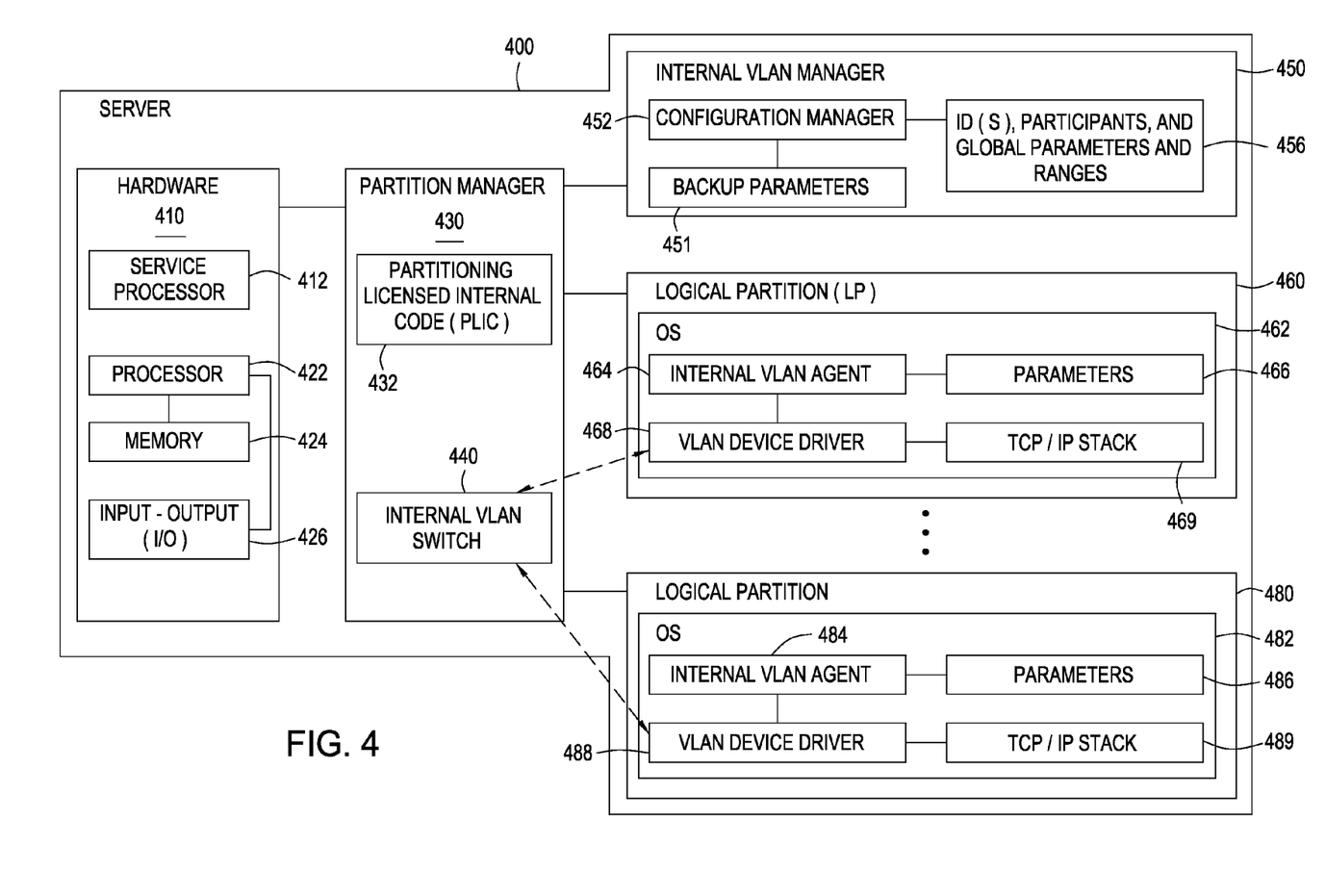
FIG. 4 is an embodiment of a server having an internal VLAN manager to auto-configure internal network interfaces in accordance with one embodiment of the present invention.

Referring now to FIG. 4, there is shown a more detailed embodiment of a server, such as server 100 in FIG. 1, for auto-configuring internal network interfaces. Server 400 provides a computer system having one or more processors and memory that can be allocated to multiple logical partitions to offer the advantage of multiple servers in terms of processing capabilities with the advantages of a single server in terms of maintenance and software management. For instance, server 400 can operate as one or more logical servers in one or more time zones, each having the capability of launching independently and each having the capability of running a different, independent operating system. In particular, server 400 includes hardware 410, a partition manager 430, an internal VLAN manager 450, and logical partitions 460 through 480.

Hardware 410 includes service processor (SP) 412, processor(s) 422, memory 424, and input-output (I/O) 426. SP 412 is a processor, separate from processors 422, substantially dedicated to hardware management for server 400. For example, when server 400 is initially powered up, SP 412 interrogates the system (Host) processor(s) 422, memory 424, and I/O 426 to obtain an inventory and topology understanding of server 400. SP 412 then proceeds to load executable code and release processor(s) 422 for execution of the code. In some embodiments, SP 412 may be configured to forward basic messages between internal VLAN manager 450 and logical partitions 460 and 480.

Processor(s) 422 include one or more system or host processors that provide the processing capacity for server 400. A system administrator can divide processor(s) 422 in accordance with logical processor units assigned to logical partitions. For example, the administrator may provide a fraction of the processing capacity available from a processor to logical partition 460.

Memory 424 may include one or more memory devices having blocks of memory associated with physical addresses.

As with processor(s) 422, memory 424 can be divided into physical blocks and associated with a logical partition or amounts of memory can be assigned to logical partitions via logical blocks of addresses. The logical addresses can be assigned to physical addresses as data is stored at the logical addresses.

I/O 426 includes I/O controllers, I/O busses and I/O adapters such as peripheral component interconnect (PCI) cards to couple server 400 with I/O equipment like tape drives, disk drives, compact disk (CD) drives, hard drives, optical drives, printers, scanners, telephone systems, and networks. I/O equipment may also be physically and/or logically associated with logical partitions.

Partition manager 430 uses low-level encoded data, often referred to as partitioning licensed internal code (PLIC) 432, to enforce logical partitioning of hardware 410 for logical partitions 460 through 480. Partition manager 430 enforces logical partitioning of hardware 410 by presenting a partitioned view of hardware to task dispatchers of higher levels of code, such as code executed within the partitions.

Partition manager 430 includes internal VLAN switch 440. Internal VLAN switch 440 may act as a network switch to forward transactions such as TCP/IP transactions from one logical partition to another. In particular, internal VLAN switch may monitor TCP/IP stack 469 of logical partition 460 for incoming transactions and upon receiving a transaction for logical partition 480, forward the transaction to TCP/IP stack 489.

Internal VLAN switch 440 may be created and/or re-configured in response to an instruction from internal VLAN manager 450. In further embodiments, any number of switches such as internal VLAN switch 440 may be created and/or re-configured based upon instructions from internal VLAN manager 450.

Internal VLAN manager 450 may interact with an administrator, e.g., via an HMC or via a display and an input device coupled directly with server 400, to create and/or re-configure internal VLAN networks for logical partitions 460 through 480. Internal VLAN manager 450 may include configuration manager 452, ID(s), partition participants, and global parameters, partition-specific parameters, and ranges 456, and backup parameters 454. Configuration manager 452 communicates with the administrator to create a communication network or re-configure an existing communication network. For example, when creating a communication network, configuration manager 452 may provide configuration consoles such as the consoles described in relation with FIGS. 2 and 3. Upon receiving an internal VLAN ID, global parameters and ranges associated with the internal VLAN ID, and a list of participants for the internal VLAN ID, configuration manager 452 instructs partition manager 430 to create internal VLAN switch 440 and interacts with the administrator to define partition specific parameters. Once the partition parameters for, e.g., logical partition 460 are defined, configuration manager 452 stores the partition parameters in backup parameters 454 and generates a message for logical partition 460 including the internal VLAN ID, global parameters, and partition parameters. Logical partition 460 responds by creating VLAN device driver 468 and TCP/IP stack 469 to facilitate communications via internal VLAN switch 440, storing the internal VLAN ID, global parameters, and partition parameters locally.

Error situations may arise when creating a communications network. For example, one of the participating partitions may not be running, may contain a conflicting configuration value, may not respond to the message, or may not recognize the message. When one of the participating partitions is not running or does not respond to the message, configuration manager 452 may offer to retry transmitting the message, queue the message and instruct partition manager 430 to wait until the corresponding logical partition is running and then transmit the message, queue the message and wait until the corresponding logical partition is running and then transmit the message (in embodiments wherein configuration manager 452 recognizes when the logical partition is running), or cancel the automatic creation of the VLAN device driver for the corresponding logical partition.

When a logical partition returns a reply indicating that the message is not recognizable, configuration manager 452 may inform the administrator that the corresponding logical partition may require manual configuration. For example, an internal VLAN agent 464 may not have been installed in the logical partition 460 so the administrator may manually set up VLAN device driver 468 via OS 462 or install the internal VLAN agent 464 and try automatic creation of the VLAN device driver 468 again.

On the other hand, when re-configuring an existing interface, configuration manager 452 may interact with the administrator to select an internal VLAN ID from ID(s), participants, and global parameters and ranges 456. Then, configuration manager 452 may generate a message for logical partition 460, for instance, to request parameters 466 associated with VLAN device driver 468 and TCP/IP stack 470. Internal VLAN agent 464 may respond to the message with a reply incorporating parameters 466, which includes the master copy of partition parameters and a local copy of the global parameters. Upon receipt of parameters 466, configuration manager 452 may interact with the administrator to obtain the modified global parameters, ranges, internal VLAN ID, and/or partition parameters via consoles such as those described in conjunction with FIGS. 2 and 3. Configuration manager 452 may then transmit the re-configured parameters to internal VLAN agent 464 to re-configure the communications network. Similar actions may then be implemented to re-configure each of the participating partitions affected by the modifications. In many embodiments, modifications to global parameters may be automatically implemented in each of the participating logical partitions and internal VLAN switch 440, overwriting the corresponding parameters in each of the affected participating partitions.

Error situations may also arise when re-configuring a communications network. When the parameters are requested from a participating logic partition, and a logical partition is not running, for instance, no parameters for that partition may be returned and, therefore, configuration manager 452 may not change the parameters for that partition. Configuration manager 452 may queue or cancel the message to re-configure the non-responding partition and inform the administrator by, e.g. graying out the corresponding partition parameters.

In situations wherein only the global parameters are changed, changes configuration manager 452 may automatically generate the partition parameters without requesting the corresponding locally stored global parameters from each participating partition. If one or more of the participating partitions does not respond, configuration manager 452 may warn the user(s) of the corresponding partition(s) of the inability to change the partition parameters and retry or cancel re-configuration.

When parameters from each partition are received and the locally stored global parameters for a participating partition are inconsistent with the master copy of the global parameters, configuration manager 452 may transmit a message to the user of the participating partition, requesting the user to make the changes.

Further, if a partition responds but no corresponding VLAN device driver is available to be re-configured, such as in cases wherein the OS for that partition has been updated or reinstalled, configuration manager 452 may advantageously give the administrator the option to invoke an internal VLAN agent for that OS to create the VLAN device driver.

Logical partitions 460 through 480 act like multiple servers although each has resources defined by a system administrator of server 400 and enforced with partition manager 430 rather than being defined physical limitations. Thus, resources of logical partitions can advantageously be modified via software rather than physically changing hardware.

In many embodiments, each logical partition operates independently from the other logical partitions. For example, one instance of the Advanced Interactive Executive (AIX) operating system, OS 462, may be executing within logical partition 460 and an OS/400 operating system, OS 482, may be operating within logical partition 480.

Each operating system running within a partition such as OS's 262 and 282 includes its own internal network agent such as VLAN agents 464 and 484, global and partition parameters such as parameters 466 and 486, internal VLAN device driver such as internal VLAN device drivers 468 and 488, and TCP/IP stack such as TCP/IP stacks 469 and 489. Each internal VLAN agent may operate in a similar manner although each internal VLAN agent is adapted to perform operations on the particular OS within which the internal VLAN agent is installed. For example, when OS 462 is an AIX operating system, internal VLAN agent 464 may receive messages from internal VLAN manager 450 in the same format as messages sent to other types of OS's but will create or re-configure VLAN device driver 468 to operate in accordance with the rules and constraints associated with the AIX operating system. Further, internal VLAN agent 464 may interpret error messages unique to the AIX operating system and generate an error message for configuration manager 452 in a format common to error messages transmitted from other types of OS's.

Internal VLAN agents such as internal VLAN agents 464 and 484 may store a copy of global parameters as well as a master copy of partition parameters in memory locally such as in parameters 466 and 486. Storing the parameters within the participating partitions may advantageously allow customization by the user of the corresponding partitions. For example, logical partition 460 may receive a message from configuration manager 452 to create a VLAN device driver. In response, OS 462 of logical partition 460 interrogates the message, determines that the message is associated with internal VLAN agent 464, and initiates internal VLAN agent 464 to process the message. In many embodiments, one VLAN device driver may be created for each internal VLAN switch such as internal VLAN switch 440.

VLAN device drivers such as VLAN device drivers 468 and 488 include agents adapted to run in each of the OS's of the participating logical partitions. VLAN device drivers receive transactions and transmit the transactions via TCP/IP stacks to another logical partition participating in the corresponding communications network. VLAN device drivers may receive transactions from other participating logical partitions in a similar manner. For example, logical partition 460 may receive a transaction via internal VLAN switch 440 and store the transaction in TCP/IP stack 469. Then, VLAN device driver 468 may retrieve the transaction from TCP/IP stack 469, process the transaction and return a completion via TCP/IP stack 469.

TCP/IP stacks such as TCP/IP stacks 469 and 489 are made up of a TCP layer and an IP layer. When data is being transmitted out of the logical partition, the data is first forwarded to the TCP layer where a TCP header is added to the data. The TCP header includes a source port number and a destination port number to identify the application programs running on the source and the destination logical partitions that are involved in the data transmission. After the TCP header is added, the data is forwarded to an IP layer where an IP header is added to the data. The IP header contains the IP addresses of the source and destination logical partitions within the corresponding communications network.

When a transaction is received by a logical partition such as logical partition 480, it is first sent to the IP layer of TCP/IP stack 489 where the IP header is stripped off the transaction, the transaction is then sent to a TCP layer where the TCP header is stripped off. At that point, the remainder of the transaction is sent to the application program to which it is destined.

A TCP/IP stack assigns an IP address to the VLAN device driver that it uses and a table to cross-reference an IP address assigned by a TCP/IP stack from a partition to that partition. The cross-reference table also allows the VLAN device driver to forward data to a partition to which the data is destined. For example, when data is being transmitted out of the logical partition 460, the IP layer in TCP/IP stack 469 will use an IP address according to the partition involved in the transaction. Likewise, when data is received, the IP address in the IP header of the data will be examined to determine to which partition the data is to be forwarded.

Figure 5A:
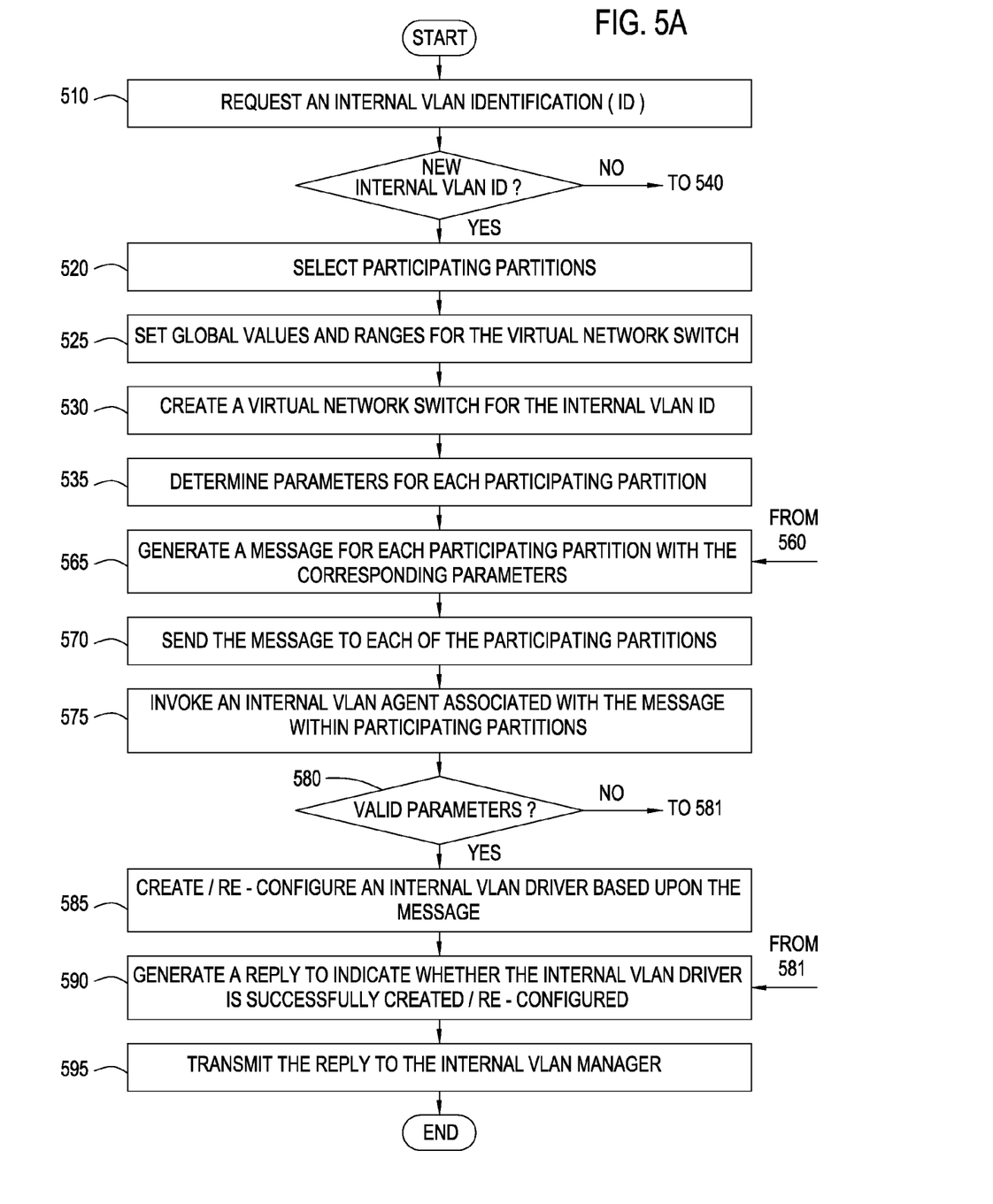
FIG. 5 depicts a flow chart for an exemplary method for auto-configuring internal network interfaces.
Figure 5B:
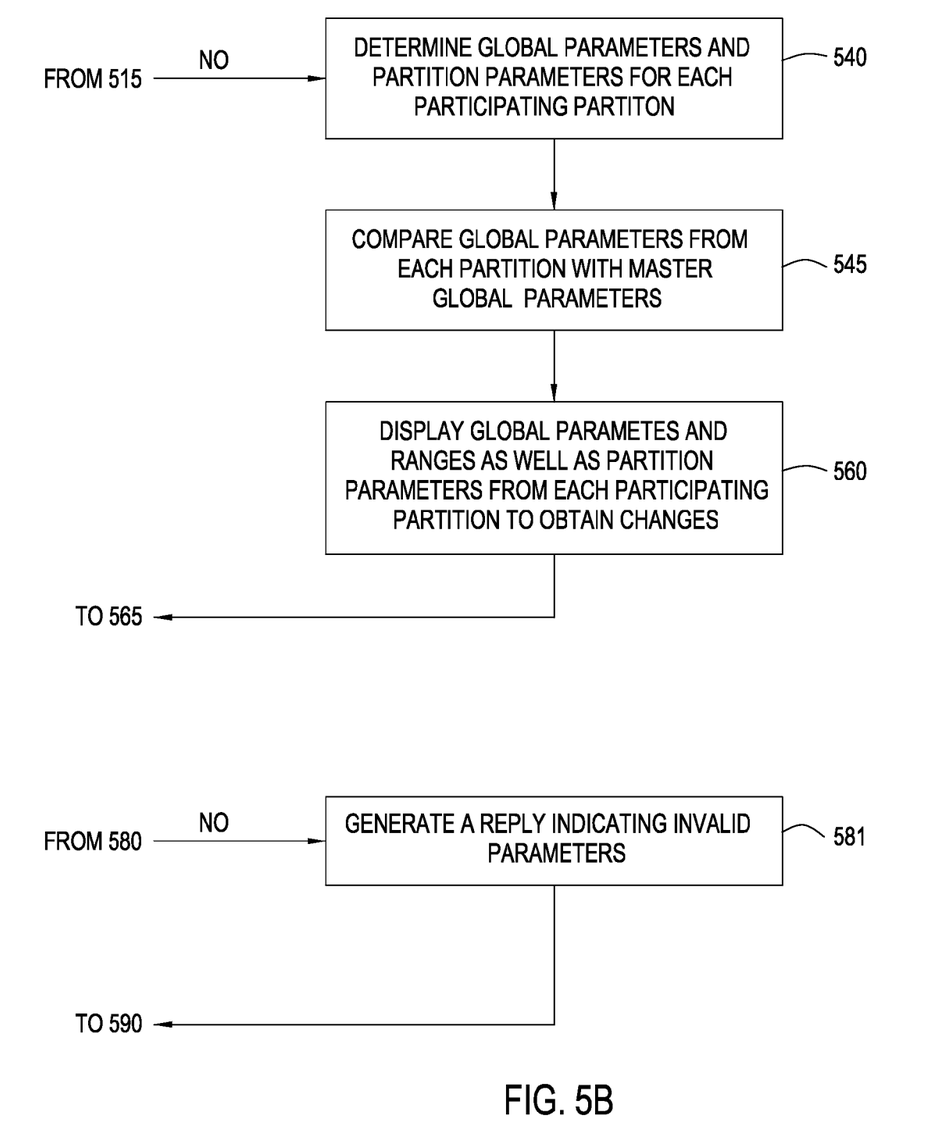

FIG. 5 depicts an example of a flow chart for a method for auto-configuring network interfaces, for example, utilizing the techniques and apparatus described above. The method begins with step 510 by requesting an internal VLAN ID. In some embodiments, an administrator may modify a current configuration of a communications network by selecting a currently used internal VLAN ID from a list or enter a new internal VLAN ID for creating a new communications network.

When the administrator enters a new internal VLAN ID (step 515), consoles may be presented to the administrator to select participating partitions from a list of partitions within the server (step 520) and setting global parameters and ranges (step 525). In some embodiments, a smart editing interface enters default values for the network based upon known constraints of OS's associated with participating partitions, a list of selectable global parameters, a default range of IP addresses and the like. A network switch for the internal network VLAN ID is then created, for example, based on the global values and ranges (step 530). In several of these embodiments, the smart editing interface also anticipates starting addresses, prefixes and/or suffixes of addresses or VLAN device driver names when determining partition parameters for each of the participating partitions (step 535). Then, the administrator can modify or enter and approve sets of partition parameters for each participating partition.

Upon approving partition parameters for a participating partition, a message is generated and transmitted to the participating partition via a partition manager in steps 565 and 570. The partition manager signals the corresponding partition with, e.g., an interrupt to indicate that the message has been delivered.

After the partition manager delivers the message, an internal VLAN agent installed in the corresponding OS is invoked (step 575). The agent then validates the parameters received in the message. For example, the parameters may include a frame size and the agent may verify that the frame size is consistent with the capabilities of the corresponding OS. The network agent may also verify parameters such as the assigned IP address to determine whether the IP address conflicts with another IP address utilized by the OS.

When one or more of the parameters conflict with existing settings or are inconsistent with constraints associated with the OS (as determined at step 580), the agent generates a reply indicating the problem (step 581). On the other hand, when the parameters are validated, the network agent creates a VLAN device driver based upon the parameters included with the message in step 585, stores the parameters locally, and generates a reply to indicate that the VLAN device driver has been successfully created in step 590. The reply is then transmitted via the partition manager back to the configuration manager.

When the administrator indicates an existing internal VLAN ID in step 510, however, the configuration manager generates and transmits messages to the participating partitions associated with the internal VLAN ID to obtain current partition parameters and locally stored global parameters (step 540). The global parameters are compared with the master copy of the global parameters to ensure consistency (step 545). When the locally stored global parameters differ from the master copy, the administrator is notified of the inconsistency and the corresponding VLAN device driver may be re-configured manually or the local settings may be overwritten with the mater copy of the global parameters.

The partition parameters for each of the participating partitions are then displayed to the administrator for editing (step 560). Once the partition parameters are modified and/or approved, the configuration manager generates and transmits messages for each of the corresponding partitions (steps 565 and 570).

Upon receipt of the messages, network agents in each of the corresponding partitions may validate the parameters, update locally stored parameters, and re-configure the VLAN device drivers. If a validation error is encountered (step 580), a reply is generated to indicate the problem (step 590) and transmitted to the configuration manager (step 595). Otherwise, the agent reconfigures the VLAN device driver in accordance with the new parameters (step 585), generates a reply to indicate successful re-configuration (step 590) and transmits the reply to the configuration manager (step 595).

While the foregoing is directed to embodiments of the present invention, other and further embodiments of the invention may be devised without departing from the basic scope thereof, and the scope thereof is determined by the claims that follow.

What is claimed is:

1. An apparatus for auto-creation of internal network interfaces for logical partitions of a computer, wherein the logical partitions participate with an internal network, the apparatus comprising:
   a logical partition having a network agent to be invoked upon receipt of a message, the logical partition being one of the logical partitions participating with the internal network, wherein the network agent is adapted to configure an internal network interface of the internal network interfaces in response to the message;
   an internal VLAN manager to determine global parameters and ranges associated with an internal network, determine partition parameters associated with the logical partition based upon the ranges, and generate the message based upon global parameters and the partition parameters, for the internal network interface; and
   a message transmitter to transmit the message from the internal VLAN manager to the logical partition.

2. The apparatus of claim 1, the network agent is adapted to validate the partition parameters based upon constraints associated with an operating system installed in the logical partition.

3. The apparatus of claim 2, wherein the logical partition is adapted to execute within the operating system when invoked by the logical partition.

4. The apparatus of claim 1, wherein the logical partition is adapted to invoke the network agent in response to an interrupt from the message transmitter, after the message is stored in memory that is accessible by the logical partition.

5. The apparatus of claim 1, wherein the internal VLAN manager comprises a configuration manager to associate the global parameters with an internal VLAN identification, the internal VLAN identification being associated with the internal network, to obtain a list of the logical partitions participating with the internal network, and to create a network switch based upon the internal VLAN identification and the list.

6. The apparatus of claim 1, wherein the internal VLAN manager is adapted to interact with an administrator to determine the internal VLAN identification, global parameters and ranges, and the partition parameters via a console.

7. The apparatus of claim 1, wherein the internal VLAN manager comprises a configuration manager to transmit another message to retrieve current partition parameters associated with the logical partition, communicate with an administrator to modify the current partition parameters, and transmit the modified partition parameters to the logical partition to reconfigure the internal network interface.

8. The apparatus of claim 1, wherein the internal VLAN manager is adapted to compare global parameters stored locally by the logical partition against a master copy of the global parameters to determine whether the network interface is to be reconfigured by the internal VLAN manager.

9. A system for auto-creation of network interfaces, the system comprising:
logical partitions of a computer, each logical partition having a network agent to be invoked upon receipt of a message, wherein the network agent is adapted to configure an internal network interface of the internal network interfaces in response to the message;
an internal VLAN manager to configure an internal network to facilitate communication between at least two of the logical partitions, the internal VLAN manager to determine distinct partition parameters for each logical partition based upon global parameters and ranges associated with the internal network and to generate messages for each logical partition, to configure the internal network interfaces; and
a logical partition manager to transmit the messages from the internal VLAN manager to the at least two logical partitions, each of the messages being transmitted to a different logical partition of at least two logical partitions based upon a list of the at least two of the logical partitions indicating an association with the internal network.

10. The system of claim 9, wherein the internal VLAN manager comprises a configuration manager to associate the global parameters with an internal VLAN identification, the internal VLAN identification being associated with the internal network, to obtain a list of the at least two of the logical partitions, and to create a network switch based upon the internal VLAN identification and the list.

11. The system of claim 10, wherein the internal VLAN manager is adapted to interact with an administrator to determine the internal VLAN identification, global parameters and ranges, and the partition parameters via consoles.

12. The system of claim 9, wherein the internal VLAN manager comprises a configuration manager to transmit another message to retrieve current partition parameters associated with the at least two of the logical partitions, communicate with an administrator to modify the current partition parameters, and transmit the modified partition parameters to the at least two of the logical partitions to reconfigure the internal network interfaces.

13. A computer readable storage medium containing a program which, when executed, performs an operation for auto-configuring an internal network interface, wherein the internal network interface supports communication between a logical partition and other participating logical partitions of a computer, and wherein the other participating logical partitions are associated with an internal network, the operation comprising:
determining an internal VLAN identification associated with the internal network;
obtaining global parameters and ranges associated with the internal network;
determining that the logical partition is participating with the internal network;
determining partition parameters for the logical partition based upon the global parameters and ranges;
generating a message having the partition parameters and being associated with a network agent; and
invoking the network agent via transmission of the message, the network agent being responsive to the message to configure the internal network interface based upon the partition parameters.

14. The computer readable storage medium of claim 13, wherein the operation further comprises transmitting the global parameters and internal VLAN identification to a logical partition manager to create an internal network switch, wherein the internal network switch is adapted to transmit transactions from the logical partition to at least one other logical partition participating with the internal network.

15. The computer readable storage medium of claim 13, wherein the operation further comprises generating a request for current partition parameters associated with the internal network interface and presenting the current partition parameters to an administrator for reconfiguring the internal network interface.

16. A computer readable storage medium containing a program which, when executed, performs an operation for auto-configuring an internal network interface, wherein the internal network interface supports communication between a logical partition and other participating logical partitions of a computer, and wherein the other participating logical partitions are associated with an internal network, the operation comprising:
receiving a message having logical partition parameters, from an internal VLAN manager, wherein the message is associated with a network agent;
invoking the network agent in response to receiving the message; and
configuring the internal network interface based upon partition parameters via the network agent.

17. The computer readable storage medium of claim 16, wherein the operation further comprises generating a reply in response to the message, wherein the reply indicates whether configuring the internal network interface is successful, and transmitting the reply to the internal VLAN manager.

18. The computer readable storage medium of claim 16, wherein the operation further comprises validating the logical partition parameters upon receipt of the message against limitations associated with the logical partition, wherein the network agent is executed by the logical partition.

19. The computer readable storage medium of claim 16, wherein configuring the internal network interface comprises creating a VLAN device driver and associating the VLAN device driver with a TCP/IP stack.

20. A computer readable storage medium containing configuration information accessible by an internal virtual local area network (VLAN) manager to set up an internal VLAN, the configuration information comprising:

an internal VLAN identification to identify the internal VLAN;

global parameters and ranges for configuring the internal VLAN switch for the internal VLAN;

at least one logical partition associated with the internal VLAN; and partition parameters to configure an internal network interface associated with the at least one logical partition, the internal network interface to be adapted by an internal network agent based upon the partition parameters for communication via the internal VLAN switch.

21. The computer readable storage medium of claim 20, wherein the global parameters and ranges comprise parameters from a group of parameters comprising a frame size, a duplex setting, and a retry value.

22. The computer readable storage medium of claim 20, wherein the at least one logical partition comprises a logical partition managed by a logical partition manager in a logically partitioned system.

23. The computer readable storage medium of claim 20, wherein the partition parameters comprise parameters from a group of parameters comprising an Internet protocol address, a port number, a VLAN interface name.

\* \* \* \* \*